(12) United States Patent
Sigler et al.

(10) Patent No.: US 7,373,946 B2
(45) Date of Patent: May 20, 2008

(54) VACUUM TANK ASSEMBLY

(75) Inventors: James A. Sigler, Perrysville, OH (US); Lorna K. Edmondson, Loudonville, OH (US); Steven L. Miko, Wooster, OH (US)

(73) Assignee: Dometic Sanitation Corporation, Big Prairie, OH (US)

( * ) Notice: Subject to any disclaimer, the term of this patent is extended or adjusted under 35 U.S.C. 154(b) by 0 days.

(21) Appl. No.: 11/255,413

(22) Filed: Oct. 20, 2005

(65) Prior Publication Data

US 2006/0085900 A1    Apr. 27, 2006

Related U.S. Application Data

(60) Provisional application No. 60/621,194, filed on Oct. 22, 2004.

(51) Int. Cl.
B67C 3/16 (2006.01)

(52) U.S. Cl. ............ 137/205; 137/565.17; 137/590; 4/431; 417/44.2

(58) Field of Classification Search ........ 137/205, 137/565.17, 590; 417/361, 359, 44.2, 36; 222/464.7, 321.7–321.9; 4/431
See application file for complete search history.

(56) References Cited

U.S. PATENT DOCUMENTS

| | | | | |
|---|---|---|---|---|
| 2,065,270 A | * | 12/1936 | De Misa | 40/473 |
| 3,045,412 A | * | 7/1962 | Bowman | 55/417 |
| 3,419,193 A | * | 12/1968 | Stewart et al. | 222/183 |
| 3,578,223 A | * | 5/1971 | Armour | 222/521 |
| 3,615,774 A | * | 10/1971 | Criss | 501/103 |
| 4,324,007 A | | 4/1982 | Morris | |
| 4,516,281 A | | 5/1985 | MacPherson et al. | |
| 5,006,677 A | * | 4/1991 | Smith et al. | 200/61.89 |
| 5,408,704 A | * | 4/1995 | Bailey et al. | 4/321 |
| 5,432,958 A | * | 7/1995 | Bochmann et al. | 4/321 |
| 5,551,097 A | | 9/1996 | Short | |
| 5,621,924 A | | 4/1997 | Friedman et al. | |
| 5,644,802 A | * | 7/1997 | Olin | 4/431 |
| 5,931,642 A | * | 8/1999 | Friedman et al. | 417/36 |
| 5,947,146 A | * | 9/1999 | Bailey et al. | 137/205 |
| 5,960,837 A | * | 10/1999 | Cude | 141/65 |
| 6,006,949 A | * | 12/1999 | Foster et al. | 222/153.13 |
| 6,065,493 A | | 5/2000 | Friedman et al. | |
| 6,148,860 A | * | 11/2000 | Sigler | 137/846 |
| 6,189,161 B1 | | 2/2001 | Rijn et al. | |
| 6,374,431 B1 | * | 4/2002 | Dahlberg | 4/431 |
| 6,397,407 B1 | | 6/2002 | Dahlberg | |
| 6,488,675 B1 | * | 12/2002 | Radford et al. | 604/540 |
| 6,618,866 B1 | | 9/2003 | Edmondson | |
| 6,782,563 B2 | | 8/2004 | Edmondson | |
| 2001/0030203 A1 | * | 10/2001 | Weber | 222/377 |
| 2005/0055759 A1 | | 3/2005 | Cameron et al. | |

* cited by examiner

*Primary Examiner*—Ramesh Kirshnamurthy
*Assistant Examiner*—Craig Price
(74) *Attorney, Agent, or Firm*—Pearne & Gordon LLP

(57) ABSTRACT

A vacuum tank assembly is provided for use on an RV or a boat and includes a two-piece vacuum tank. The two-piece vacuum tank includes a body and a removable top with a gasket located between the body and removable top. A dip tube is integrated into the removable top, thus, forming an opening in the removable top and thereby reducing maintenance problems associated with mechanically attached dip tube assemblies. A vacuum pump is provided to pump the waste out of the vacuum tank into a holding tank.

23 Claims, 4 Drawing Sheets

VACUUM TANK ASSEMBLY

This application claims the benefit of U.S. Provisional Patent Application No. 60/621,194 filed on Oct. 22, 2004.

FIELD OF THE INVENTION

The present invention relates to toilets and more particularly, to a toilet and vacuum tank that is suitable for a boat, recreational vehicle, bus or the like.

BACKGROUND OF THE INVENTION

U.S. Pat. Nos. 5,621,924, 6,618,866, and 6,782,563, the disclosures all of which are herein incorporated by reference, disclose a vacuum tank construction for use with a vacuum toilet assembly that have a number of advantages over the prior art. While the vacuum tank of the present invention functions primarily in the same manner as the vacuum tanks disclosed in the above mentioned patents the construction of the present invention has several features that provide a number of advantages over these patents.

For example, the construction according to the present invention is more compact both vertically and horizontally than the vacuum tanks disclosed in the above patents thus permitting mounting in more compact areas. Further, the vacuum tank construction according to the present invention incorporates a two-piece tank design for ease of maintenance. The vacuum tank construction according to the present invention also incorporates an integrated dip tube design that increases the performance of a vacuum pump and reduces tolerances associated with the dip tube assemblies of the above patents. Conventional dip tubes, as described in the above patents, are mechanically attached to the vacuum tank by a method known in the art such as screwing, gluing, etc. and may shift over time thus creating leaks in the joints and thus decreasing the pumping efficiency of the vacuum pump. In addition, the shifting of the dip tube may reduce the gap between the opening at the bottom of the dip tube and the bottom of the vacuum tank and thus may create plugging possibilities.

It is the primary object of the present invention to provide a compact vacuum tank having the same or improved functionality as conventional vacuum tanks, and a desirable dip tube assembly for use therewith. This and other objects of the invention will become clear from an inspection of the detailed description of the invention and from the appended claims.

BRIEF SUMMARY OF THE INVENTION

In accordance with one aspect a vacuum tank assembly is provided comprising a body having a plurality of sides and a bottom, a removable top operatively attached to the body, and a dip tube integrated into the removable top thereby forming a first opening in the removable top where the dip tube further includes a bottom and an opening at the bottom and extending from the removable top in a downward direction toward the bottom of the body thereby forming a gap between the bottom of the dip tube and the bottom of the body.

In accordance with another aspect of the invention a vacuum tank assembly is provided comprising a body having a plurality of sides and a bottom, a removable top operatively attached to the body, a dip tube integrated into the removable top, the dip tube further including a bottom and an opening at the bottom, and a vacuum pump operatively attached to the dip tube, where the vacuum pump includes a housing having a flange with a plurality of slots for rotatably attaching the housing to the removable top.

Additional benefits and advantages of the present invention will become apparent to those skilled in the art to which it pertains upon a reading and understanding of the following detailed specification.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
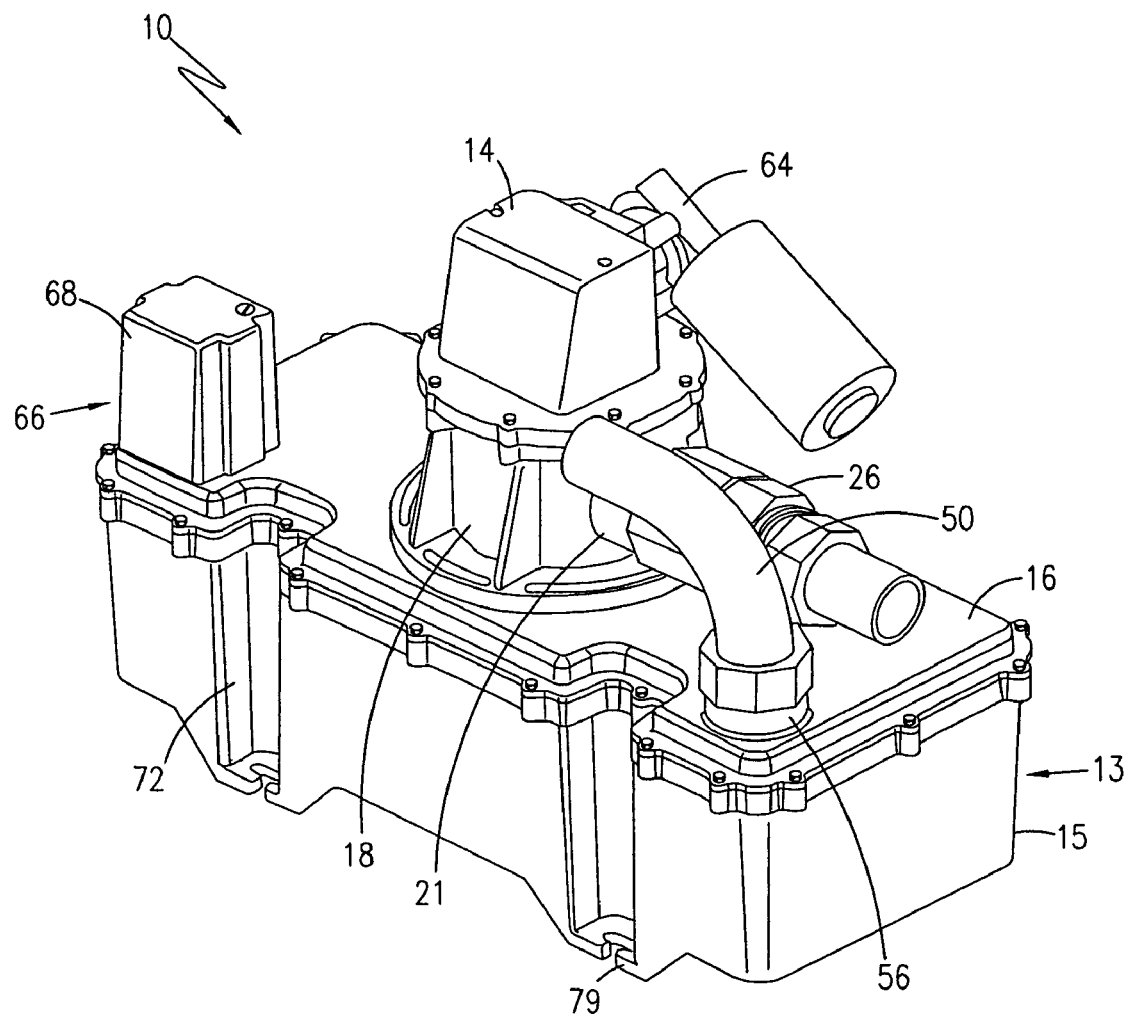
FIG. 1 is an assembled perspective view of an exemplary vacuum tank assembly according to the present invention usable in a vacuum toilet assembly.
Figure 2:
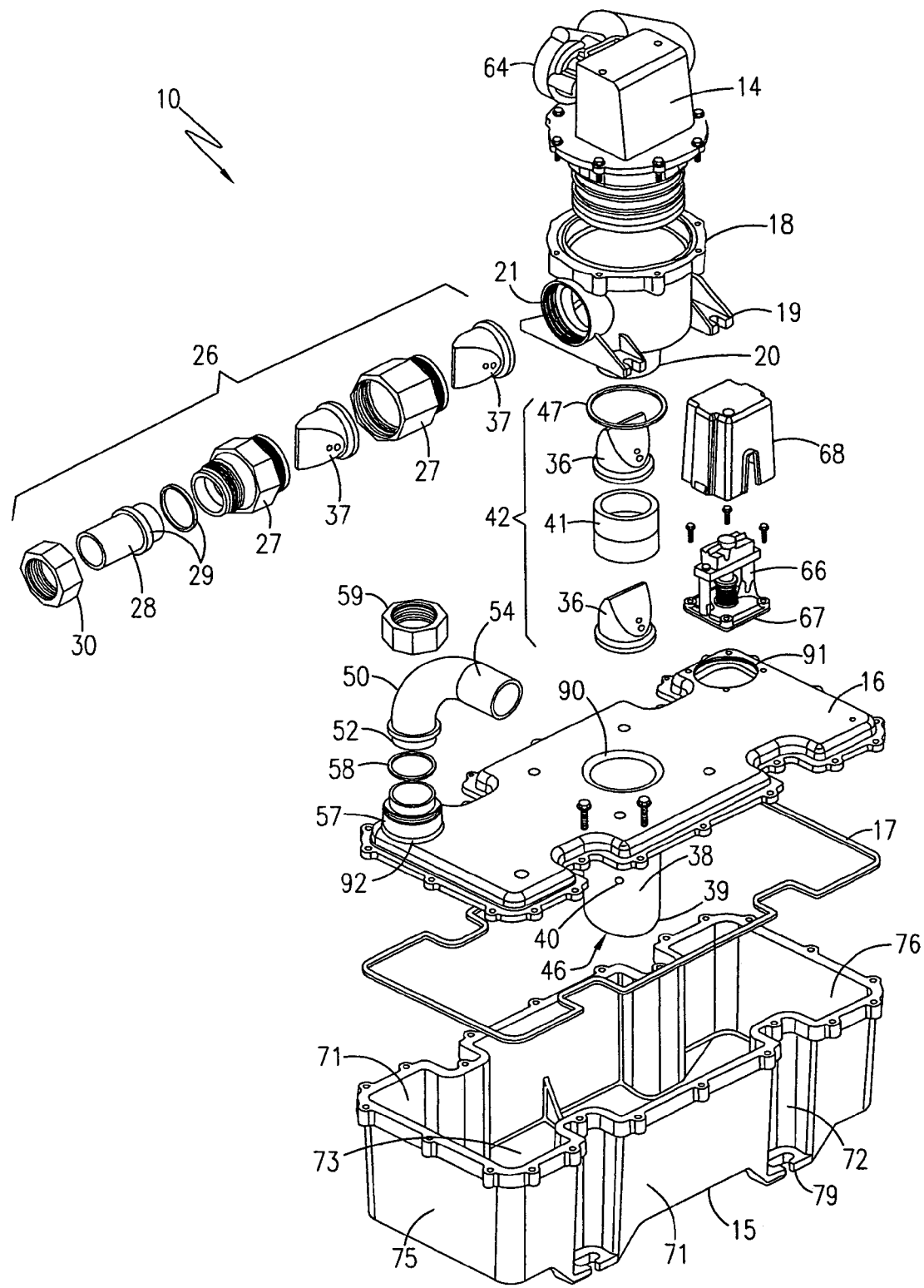
FIG. 2 is an exploded perspective view of an exemplary vacuum tank assembly according to the present invention usable in a vacuum toilet assembly.
Figure 4:
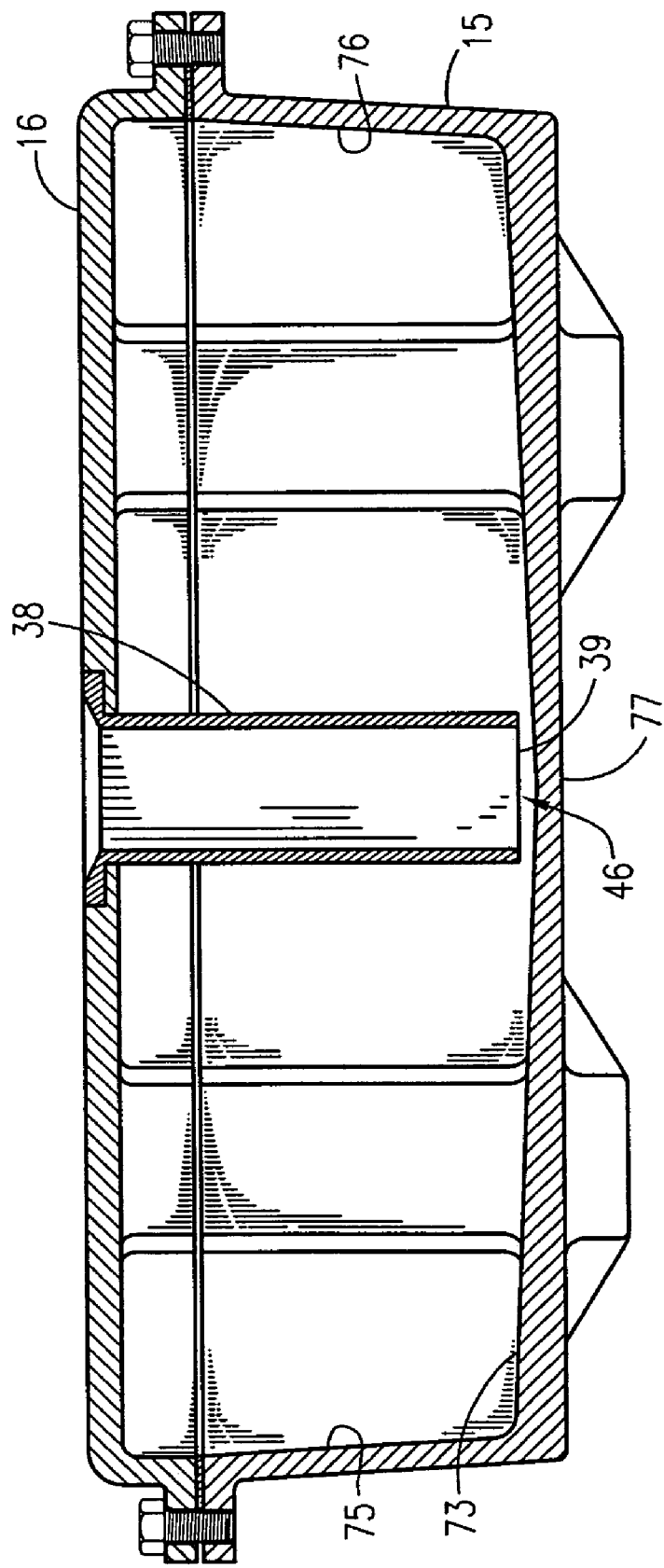
FIG. 4 is a cross sectional view of the vacuum tank as viewed from side 71.

Referring now to the drawings, FIGS. 1 and 2 show an assembled and exploded view respectively of a vacuum tank assembly 10 in accordance with the present invention having a two-piece vacuum tank 13 construction. The vacuum tank 13 includes a hollowed-out body 15 and a removable top 16. The two-piece construction facilitates serviceability of the vacuum tank 13. The vacuum tank 13 may be constructed by any means known in the art such as injection molding, rotational molding, etc. and is preferably made of plastic, such as low density polyethylene. In the preferred embodiment, the vacuum tank 13 is injection molded to thereby provide tighter tolerances. The vacuum tank 13 preferably has a nominal wall thickness of about 0.188 inches (0.478 cm) with no flat surface area of greater than about 80 square inches (516.13 square cm). When assembled, the exterior of the vacuum tank 13 generally approximates a rectangular parallelepiped or prism configuration and may have a length of about 12-20 inches (30.5 cm-50.8 cm). A gasket 17 made of any suitable material known in the art is positioned between the body 15 and the top 16 to provide an airtight and liquid tight seal between the body 15 and the top 16. The gasket 17 ensures proper operation of the vacuum tank assembly 10 during operation. The body 15 includes sides 71, 75, and 76 and a bottom 73. The sides 71 further include at least one surface manifestation 72 to provide strength to the body 15 of the vacuum tank 13 and minimize any flat continuous surface area of the vacuum tank 13. As shown in FIG. 4, the bottom 73 may be contoured in a downward direction from each side 71, 75, 76 to the center 77 of the bottom 73 of the body 15. Thus, the bottom 73 has an uneven configuration so that pumpable waste in the vacuum tank 13 has a tendency to flow slightly toward a dip tube 38 that extends downward from the top 16 of the vacuum tank 13 as will be described further below.

The vacuum tank 13 preferably has mounting flanges 79 that support the vacuum tank 13 on a surface on which it rests or to which it is attached. The vacuum tank 13 may be attached to a surface on which it is mounted by placing fasteners extending through the openings in the mounting flanges 79 into the mounting surface.

The removable top 16 includes a first 90, second 91 and third 92 opening and a dip tube 38. The dip tube 38 is an integrated portion of the top 16 thereby forming the first opening 90. The dip tube 38 extends in a downward direction from the top 16 to the bottom 73 of the vacuum tank 13. The dip tube 38 further includes an opening 46 at its bottom 39 to allow the waste to travel up through the dip tube 38 as will be described further below. The opening 46 is adjacent, e.g. slightly above, the bottom 73 of the vacuum tank 13 thereby forming a gap between the bottom 39 of the dip tube 38 and the bottom 73 of the vacuum tank 13 as shown in FIG. 4. The integrated dip tube 38 allows the gap remain constant, thus, minimizing any potential plugging issues. Furthermore, the integrated dip tube 38 reduces tolerances and leaks that may exist with conventional dip tubes as described above. The dip tube 38 further includes at least one drain hole 40 or slot to allow the tube contents to drain into the tank when replacing check valves. The first 90, second 91, and third 92 openings are connected to a vacuum pump 14, a vacuum switch 66, and a waste inlet conduit 50 respectively and will be described further below. It should be noted that the arrangement of the three openings 90, 91, and 92 can be arranged in a multitude of arrangements on the top 16 for example, the second 91 and third 92 openings can be switched.

Figure 3:
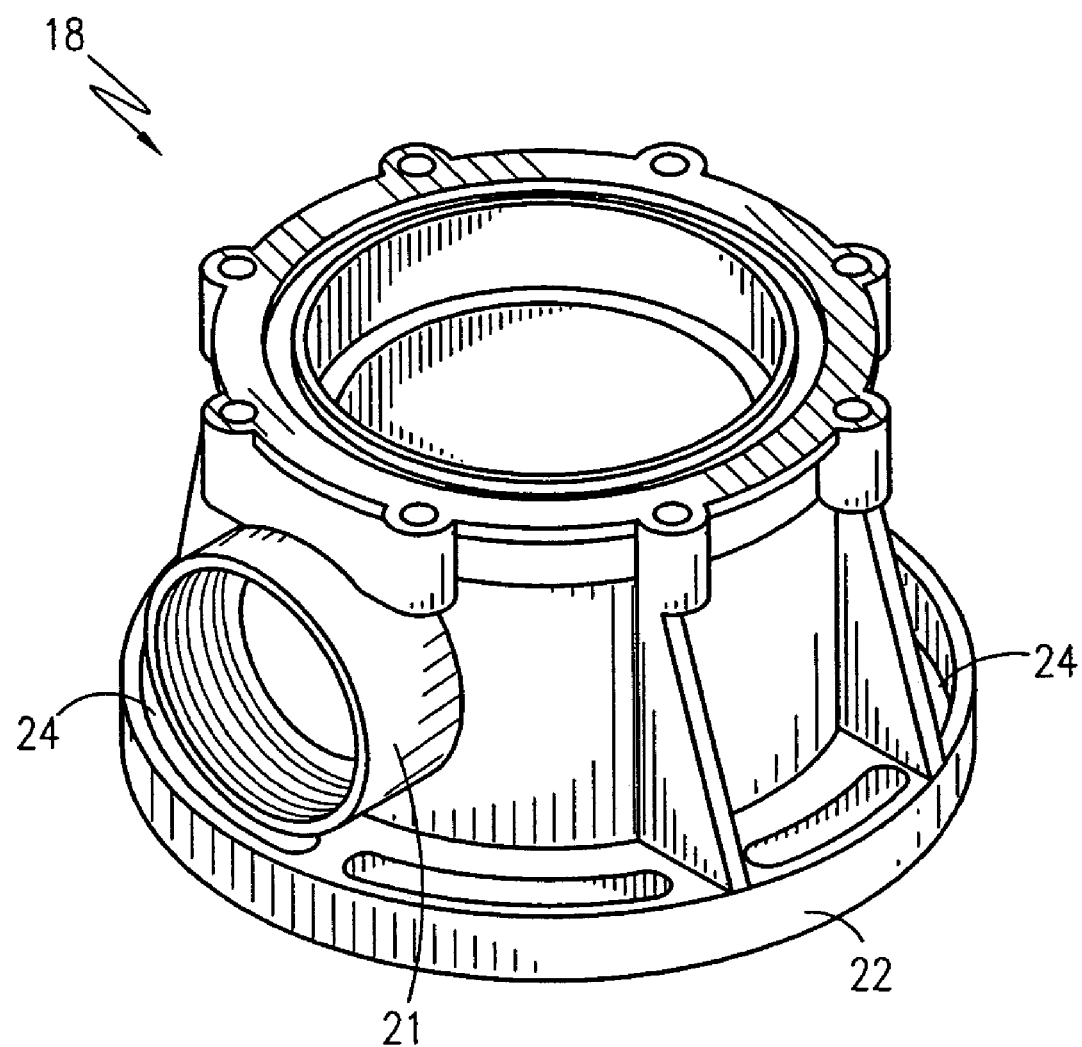
FIG. 3 is a perspective view of a slotted pump mounting flange.

The vacuum pump 14 may be any type of vacuum pump known in the art and includes a motor 64 and a housing 18. The housing 18 includes a downwardly extending pump inlet port 20 located at the bottom of the housing 18 and a pump outlet port 21 that extends out of the side of the housing 18 and is substantially perpendicular to the pump inlet port 20. Because the pump inlet port 20 extends in a downwardly direction the vacuum pump 14 can be rotated to accommodate the position of the pump outlet port 21 without affecting the position of the pump inlet port 20. Thus, the positions of the pump inlet port 20 and the pump outlet port 21 are independent of one another whereas in the conventional method, as described in the above mentioned patents, the positions of the pump inlet and outlet are dependent on one another, thus, it is not possible to rotate the pump. In one embodiment the housing 18 includes multiple slotted feet 19 to attach the housing 18 to the top 16 of the vacuum tank 13. In a preferred embodiment, the housing 18 may include a flange 22 having slots 24 as shown in FIG. 3. The slots 24 allow rotation of the housing 18 to thereby accommodate positioning of the pump outlet port 21 as described above.

The first opening 90 is connected to the vacuum pump 14 by means of an inlet adapter assembly 42 via the pump inlet port 20. The inlet adapter assembly 42 includes an inlet adapter tube 41 and an o-ring 47. The inlet adapter tube 41 can be attached to the first opening 90 by any means known in the art such as a screw type connection such as the one illustrated in FIG. 8 of U.S. Pat. Nos. 6,618,866 and 6,782,563. The o-ring 47 provides an airtight and liquid tight seal between the first opening 90 and the pump inlet port 20. One or multiple duckbill check valves 36 can be provided at the pump inlet port 20 to prevent backup of waste into the vacuum tanks 13. Conventional duckbill check valves have a diameter of about 1.5 inches. In the present invention the duckbill check valves 36, 37 have a diameter of about 2 inches thus increasing the throughput area and thereby increasing pump capacity thus reducing the possibility of plugging.

The pump outlet port 21 is connected to a waste/holding tank similar to the waste/holding tank as shown in U.S. Pat. No. 5,621,924 by means of an outlet adapter assembly 26. The outlet adapter assembly 26 includes threaded conduit 27, conduit 28, duckbill check valves 37, o-rings 29, and a locking nut 30. It should be noted that the inlet adapter assembly 42 and the outlet adapter assembly 26 can be interchangeable to reduce manufacturing, inventory, and maintenance costs. The connection to the waste/holding tank is commonly known in the art and will not be described in further detail.

A vacuum switch 66 for controlling the motor 64 is connected to the second opening 91 and includes a base 67 for mounting the vacuum switch 66 to the top 16 of the vacuum tank 13. The base 67 may be mounted by a method known in the art such as by a screw type connection. The vacuum switch 66 further includes a cover 68 that attaches to the base 67 by a method known in the art such as a screw or snap type connection. In the preferred embodiment the cover 68 attaches to the base 67 using a snap type connection for ease of maintenance.

The waste inlet conduit 50 is connected to the third opening 92 at a first end 52 and to a vacuum toilet at a second end 54. The first end 52 can be secured to the third opening 92 by means known in the art such as with the use of an adapter assembly 56 as shown in FIG. 1 or by a screw type connection, adhesive connection, friction fit, etc. The adapter assembly 56 includes an adapter 57, an o-ring 58, and a locking nut 59. The second end 54 can be connected to the vacuum toilet by a flexible hose or the like as illustrated in U.S. Pat. No. 5,621,924. The waste inlet conduit 50 can be any shape known in the art for example a straight conduit or preferably in the shape of an elbow as shown in FIG. 1. The waste inlet conduit 50 can be rotated to any position to facilitate mounting versatility. Furthermore, in the preferred embodiment the elbow waste inlet conduit 50 can be made tall enough to extend over the pump outlet port 21.

During operation of the vacuum tank assembly 10, the vacuum switch 66 activates the motor 64 to power the vacuum pump 14. Waste within the tank 13 is pulled up through the opening 46 in the bottom 39 the dip tube 38 and is pumped through the pump inlet port 20 into the vacuum pump 14 and out the pump outlet port 21 into the holding tank. Once the desired level of vacuum is reached in the vacuum tank 13, the vacuum switch 66 deactivates the motor 64 and the desired level of vacuum is maintained in the tank 13.

While specific embodiments of the invention have been described and illustrated, it is to be understood that these embodiments are provided by way of example only and that the invention is not to be construed as being limited thereto but only by proper scope of the following claims.

What is claimed is:

1. A vacuum tank assembly comprising:
   a body having a plurality of sides and a bottom;
   a removable top operatively attached to the body;
   a dip tube integrated into the removable top thereby forming a first opening in the removable top, the dip tube further including a bottom and an opening at the bottom and extending from the removable top in a downward direction toward the bottom of the body thereby forming a gap between the bottom of the dip tube and the bottom of the body;
   a housing having a pump inlet port and a pump outlet port, each of the pump inlet and pump outlet ports being formed with the housing, the housing being operatively attached to the removable top about the first opening, the housing being located generally above the first opening such that the position of the first opening is generally centered below the housing;
an inlet adapter assembly having at least one check valve and an o-ring; and,
a motor-driven vacuum pump mounted to the housing and operatively attached to the first opening with the inlet adapter assembly via the pump inlet port,
wherein the pump inlet port extends a distance into the dip tube and has a generally tubular geometry with a central axis extending along its longitudinal length that is coaxial with a central axis of the first opening,
wherein the pump inlet port is operatively and sealingly connected to the dip tube by the o-ring of the inlet adapter assembly; and
wherein the pump outlet port extends in a direction substantially perpendicular to the pump inlet port.

2. The vacuum tank assembly of claim 1, wherein the pump inlet port extends in a downward direction from the housing and wherein rotation of the housing to position the pump outlet port is independent of the pump inlet port.

3. The vacuum tank assembly of claim 1, further comprising an outlet adapter assembly connecting the pump outlet port to a waste-holding tank, wherein the inlet adapter assembly and the outlet adapter assembly are interchangeable.

4. The vacuum tank assembly of claim 1, wherein the housing further comprises a mounting flange having slots to allow rotation of the housing.

5. The vacuum tanks assembly of claim 1, wherein the at least one check valve is a duck bill check valve having a diameter of approximately 50.8 millimeters (approximately 2 inches) to provide increased throughput.

6. The vacuum tank assembly of claim 1 further comprising:
second and third openings located in the removable top;
a vacuum switch operatively connected to the second opening; and,
a waste inlet means operatively connected to the third opening.

7. The vacuum tank assembly of claim 1, wherein each side includes at least one surface manifestation to provide strength to the body and wherein the exterior of the vacuum tank assembly has a generally rectangular prism configuration and has no continuous flat surface greater than 516.13 square centimeters (80 square inches).

8. The vacuum tank assembly of claim 1, wherein the bottom of the body is contoured in a downward direction from each side toward the dip tube.

9. The vacuum tank assembly of claim 1, wherein the dip tube further includes at least one hole to allow waste to drain into the vacuum tank when replacing the check valve.

10. The vacuum tank assembly of claim 1 further comprising a gasket located between the removable top and the body.

11. A vacuum tank assembly comprising:
a body having a plurality of sides and a bottom
a removable top operatively attached to the body and having at least one opening having a central axis;
a dip tube integrated into the removable top and forming the at least one opening, the dip tube having a generally tubular geometry with a central axis extending along its longitudinal length that is generally coaxial with the central axis of the at least one opening, and further including a bottom and an opening at the bottom;
an inlet adapter assembly having at least one check valve and an o-ring; and,
a vacuum pump operatively attached to the dip tube, the vacuum pump including a housing having a flange with a plurality of slots for rotatably attaching the housing to the removable top about the at least one opening, the housing being located generally above the at least one opening such that the position of the at least one opening is generally centered below the housing, the housing further including a pump inlet port and a pump outlet port,
wherein the pump inlet port extends in a downward direction generally towards the at least one opening and is operatively and sealingly connected to the dip tube by the o-ring of the inlet adapter assembly, the pump inlet port extending a distance into the dip tube and having a generally tubular geometry with a central axis extending along its longitudinal length that is coaxial with the central axis of the at least one opening, and
wherein the pump outlet port extends in a direction substantially perpendicular to the pump inlet port, the pump inlet port and the pump outlet port being independent of each other such that rotation of the housing causes a change of orientation of the pump outlet port relative to the dip tube while maintaining the central axis of the pump inlet port generally coaxial with the central axle axes of the dip tube and the at least one opening.

12. The vacuum tank assembly of claim 11 further comprising second and third openings located in the removable top, wherein the dip tube extends in a downward direction from the removable top toward the bottom of the body thereby forming a gap between the bottom of the dip tube and the bottom of the body.

13. The vacuum tank assembly of claim 11, wherein the bottom of the body is contoured in a downward direction from each side toward the dip tube.

14. The vacuum tank assembly of claim 11, wherein each side includes at least one surface manifestation to provide strength to the body and wherein the exterior of the vacuum tank assembly has a generally rectangular prism configuration.

15. The vacuum tank assembly of claim 11, wherein the dip tube further includes at least one hole to allow waste to drain into the vacuum tank when replacing the check valve.

16. The vacuum tank assembly of claim 11, wherein the inlet adapter assembly further includes at least two check valves and an inlet adapter tube, at least one of the check valves being located vertically above the inlet adapter tube and at least one of the check valves being located vertically below the inlet adapter tube.

17. The vacuum tank assembly of claim 11, wherein vacuum pump is a motor-driven vacuum pump.

18. The vacuum tank assembly of claim 12 further comprising:
a vacuum switch including a cover and operatively connected to the second opening, wherein the cover has a snap type connection; and,
a waste inlet conduit rotatably connected to the third opening.

19. The vacuum tank assembly of claim 18, wherein the waste inlet conduit is in the form of an elbow and extends over the pump outlet port.

20. A vacuum tank assembly comprising:
a body having a plurality of sides and a bottom
a removable top operatively attached to the body and having at least a first opening and a second opening;

a dip tube integrated into the removable top and forming the first opening, the dip tube further including a bottom and an opening at the bottom;

a waste inlet means operatively connected to the second opening;

a vacuum pump operatively attached to the dip tube, the vacuum pump including a housing having a flange with a plurality of slots for rotatably attaching the housing to the removable top about the first opening, the housing further including a pump inlet port and a pump outlet port, each of the pump inlet and pump outlet ports being formed with the housing, and wherein the housing is located generally above the first opening such that the position of the first opening is generally centered below the housing;

an inlet adapter assembly having at least one check valve and an o-ring sealingly attaching the pump inlet port to the dip tube via the first opening; and an outlet adapter assembly having at least one check valve and an o-ring adapted to sealingly attach the pump outlet port to a holding tank;

wherein the pump inlet port extends in a downward direction generally towards the first opening and a distance into the dip tube, and is operatively and sealingly connected to the dip tube by the o-ring of the inlet adapter assembly, the pump outlet port extending in a direction at an angle to the pump inlet port, the pump inlet port and the pump outlet port being independent of each other such that rotation of the housing causes a change of orientation of the pump outlet port relative to the dip tube without changing a spatial position of the pump inlet port relative to the dip tube.

21. The vacuum tank assembly of claim 20, wherein the dip tube has a generally tubular geometry with a central axis extending along its longitudinal length and the pump inlet port has a generally tubular geometry with a central axis extending along its longitudinal length, rotation of the housing causing a change of orientation of the pump outlet port relative to the dip tube while maintaining the central axis of the of the pump inlet port generally coaxial with the central axis of the dip tube.

22. The vacuum tank assembly of claim 20, wherein the dip tube further includes at least one hole extending therethrough to allow waste to drain into the vacuum tank when replacing the at least one check valve.

23. The vacuum tank assembly of claim 20, wherein the pump outlet port extends in a direction substantially perpendicular to the pump inlet port.

\* \* \* \* \*